Figure 1:
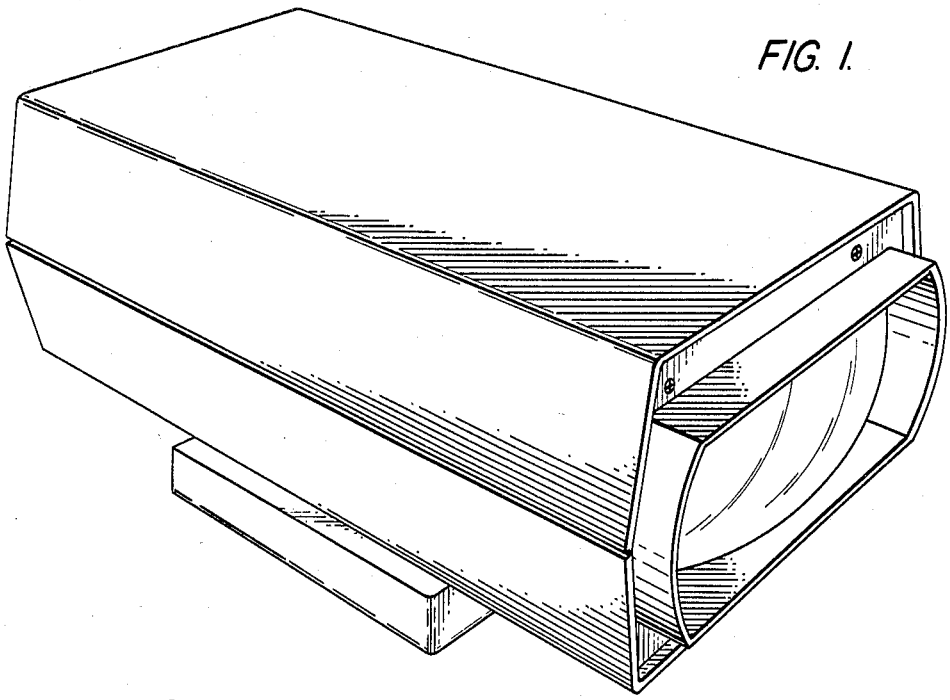
Figure 2:
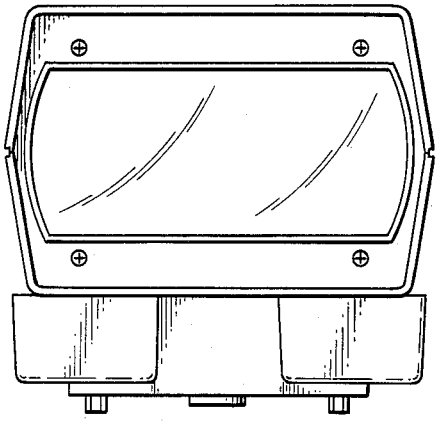
Figure 3:
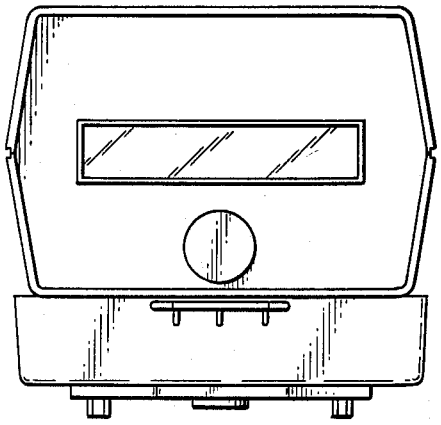
Figure 4:
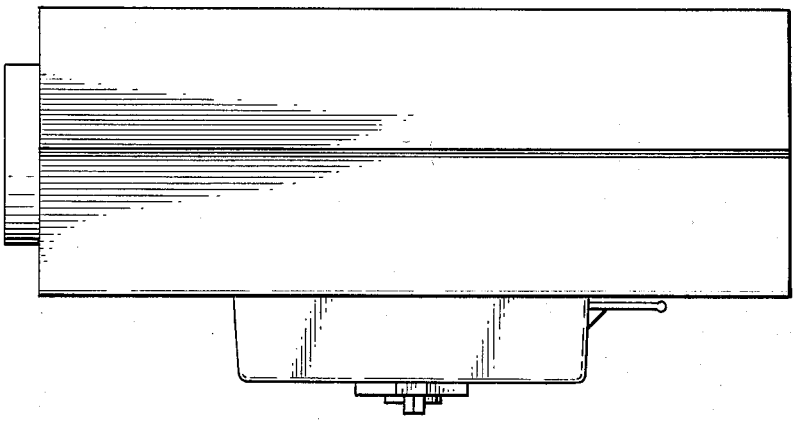
Figure 5:
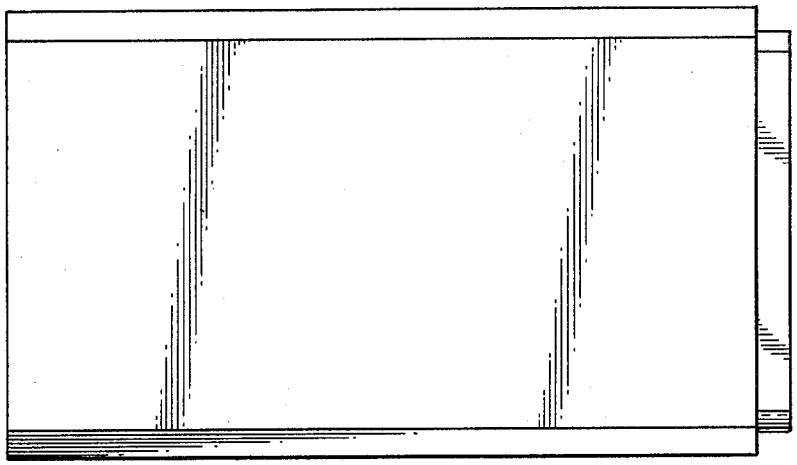
Figure 6:
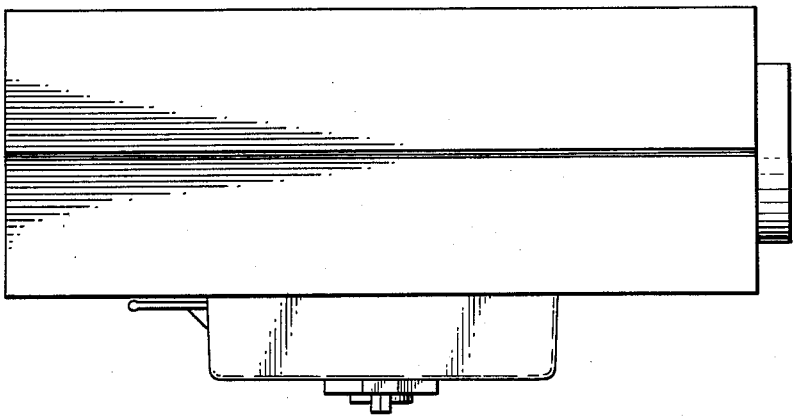
Figure 7:
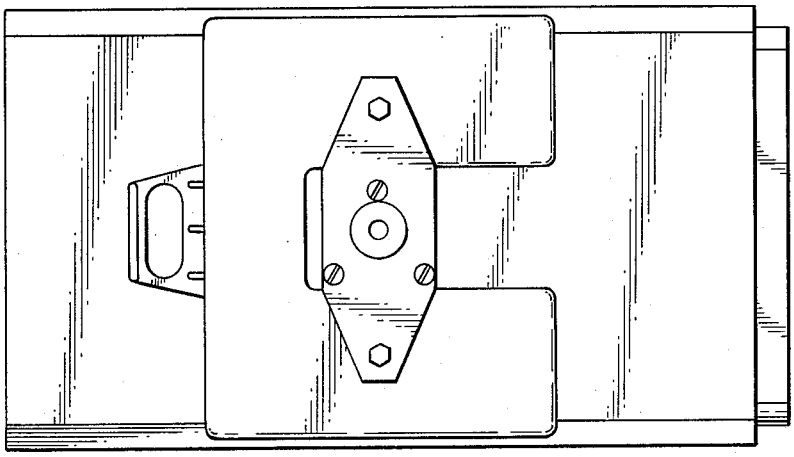

United States Defensive Publication [19] (H) [11] T101,001

Shipp et al. [43] Sep. 1, 1981

[54] ELECTRONIC DISTANCE MEASURING INSTRUMENT

[76] Inventors: John I. Shipp, 1422 S. Country Club La.; Charlie C. Rogers, P.O. Box 1107, both of Tullahoma, Tenn. 37388

[21] Appl. No.: 154,044

[22] Filed: May 28, 1980

[51] Int. Cl. ..... D10/04

[52] U.S. Cl. ..... D10/70

[57] ABSTRACT

The design relates to an electronic distance measuring instrument substantially as shown.

1 Claim, 2 Sheets Drawing,

2 Pages Specification

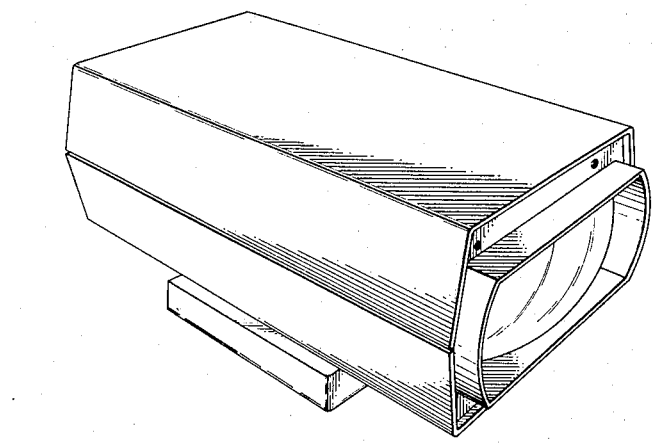

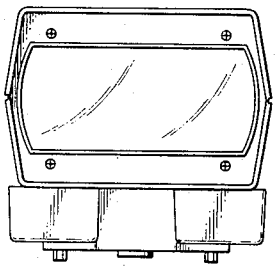

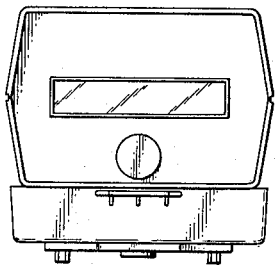

The file of this unexamined application may be inspected and copies thereof may be purchased (849 O.G. 1221, Apr. 9, 1968).